Sept. 6, 1960  N. A. SCHUSTER  2,951,982
SYSTEMS FOR ELECTROMAGNETIC INVESTIGATION OF MEDIA
Filed July 22, 1955  6 Sheets-Sheet 1

Fig. 1

INVENTOR.
NICK A. SCHUSTER
BY William R. Sherman
HIS ATTORNEY

Sept. 6, 1960  N. A. SCHUSTER  2,951,982
SYSTEMS FOR ELECTROMAGNETIC INVESTIGATION OF MEDIA
Filed July 22, 1955  6 Sheets-Sheet 2

INVENTOR.
NICK A. SCHUSTER
BY *William R. Sherman*
HIS ATTORNEY

Sept. 6, 1960 N. A. SCHUSTER 2,951,982
SYSTEMS FOR ELECTROMAGNETIC INVESTIGATION OF MEDIA
Filed July 22, 1955 6 Sheets-Sheet 6

INVENTOR.
NICK A. SCHUSTER
BY William P. Sherman
HIS ATTORNEY

United States Patent Office 2,951,982
Patented Sept. 6, 1960

2,951,982

SYSTEMS FOR ELECTROMAGNETIC INVESTIGATION OF MEDIA

Nick A. Schuster, Ridgefield, Conn., assignor, by mesne assignments, to Schlumberger Well Surveying Corporation, Houston, Tex., a corporation of Texas Filed July 22, 1955, Ser. No. 523,692

17 Claims. (Cl. 324—6)

The present invention relates to the investigation of resistivity characteristics of media and, more particularly, to methods and apparatus for electromagnetically investigating the resistivity characteristics of media, such as earth formations traversed by a borehole.

Measurements of the resistivity of media at various subsurface depths have successfully been obtained by introducing current at the surface of a medium and detecting significant potential differences. For example, in Patent No. 2,669,688, issued on February 16, 1954, to H. G. Doll, are disclosed methods and apparatus for making highly localized, simultaneous electrical resistivity measurements against the wall of a borehole drilled into the earth. Measurements obtained provide indications of formation resistivities at different shallow depths of investigation, one depth being approximately equal to the probable thickness of any mud cake formed on the surface of permeable formations. The other depth is slightly greater to include a zone in permeable formations underlying a mud cake and subject to invasion by mud filtrate. Since the presence of a mud cake on the wall of a borehole is an indication of invasion of the formation by mud filtrate, hence, that a formation is permeable, proper interpretation of the measurements enables permeable formations to be located in a highly effective manner.

Since each of these electrical resistivity measurements is affected to a marked degree by the mud cake formed on the permeable formations, neither measurement is clearly indicative of the resistivity of material comprising the invaded zone of the formation lying behind a mud cake. Furthermore, in certain instances the differentiation effected by the mud cake in the resistivity measurements made as described above may be small. In such instances, an interpretation of the measurements to delineate the permeable formations is somewhat difficult.

It is an object of this invention, accordingly, to provide new and improved methods and apparatus for the investigation of resistivity characteristics at selected depths beneath the surface of media.

Another object of the invention is to provide new and improved methods and apparatus for identifying the presence or absence of a difference of resistivity in localized zones near to and more remote from the surface of a medium.

Another object of the invention is to provide methods and apparatus for making electrical resistivity measurements at the wall of a borehole which are indicative of the resistivities of an invaded zone lying behind mud cake formed on permeable formations.

Yet another object of the invention is to provide new and improved methods and apparatus for obtaining a localized resistivity measurement against the wall of a borehole which is substantially independent of the resistivity of any mud cake formed on the wall of a borehole.

Still another object of the invention is to provide new and improved methods and apparatus for detecting the presence of mud cake on the walls of formations traversed by a borehole.

Yet another object of the invention is to provide a novel system for regulating the current passing in a subsurface zone of a medium.

These and other objects of the invention are attained by connecting spaced points on the surface of a medium to form a single loop circuit and placing opposite the surface a focused multiple coil circuit which has a maximum inductive coupling with the loop circuit when the effective circuit path through the medium lies at a selected depth beneath the surface. The selectivity afforded by mutual inductance between the focused coil circuit and the circuit which includes a path through the medium allows, on the one hand, a determination of the resistivity at the effective depth of investigation and, on the other hand, a discrimination between regions in which the resistivity is uniform with depth and regions in which resistivity may, for example, increase with depth.

According to one form of the invention, current is passed through the single loop circuit which includes a path between the two points through the medium. By coupling the focused coil circuit primarily with the component of this current flowing along a path at a selected depth, the potential induced in the coil circuit is made proportional to this component. This component of current is made constant by altering the magnitude of the total current inversely with the potential induced in the coil circuit. A potential difference detected in the vicinity of the current then affords an indication of the apparent resistivity at the selected depth. To measure resistivity in the invaded zone of a permeable formation, for example, the depth of focus is set within the anticipated bounds of an invaded zone. In this instance, an increase in the current necessary to maintain the induced potential constant indicates the presence of a mud cake.

In another form of the invention, a potential difference in the vicinity of a current which is passed through a medium between surface points is maintained constant by a regulation of the current. An indication of conductivity in a subsurface zone is afforded then by the potential induced in the focused coil circuit which is coupled primarily to that zone. The conductivity obtained in a well logging application is that of the invaded zone. In such application, an indication of the presence of mud cake is provided by an increase in the regulated current relative to the induced potential of the coil circuit.

In a third form of the invention, a steady current is passed between points located, for example, on the wall of a borehole. By forming the ratio between a potential difference along the current path and the potential induced in a coil circuit which is focused on the component of current in the invaded zone, an indication of invaded-zone resistivity is derived.

In yet another form of the invention, a constant current is passed between one point on a borehole wall and oppositely spaced points. By focusing a coil system on each portion of the divided current at a depth corresponding to an invaded zone, a drop in potential induced in this coil system is made indicative of the presence of a mud cake underlying the points.

Additional objects and advantages of the invention will become apparent from the following detailed description of several typical embodiments thereof, taken in conjunction with the accompanying drawings, in which.

Figure 1:
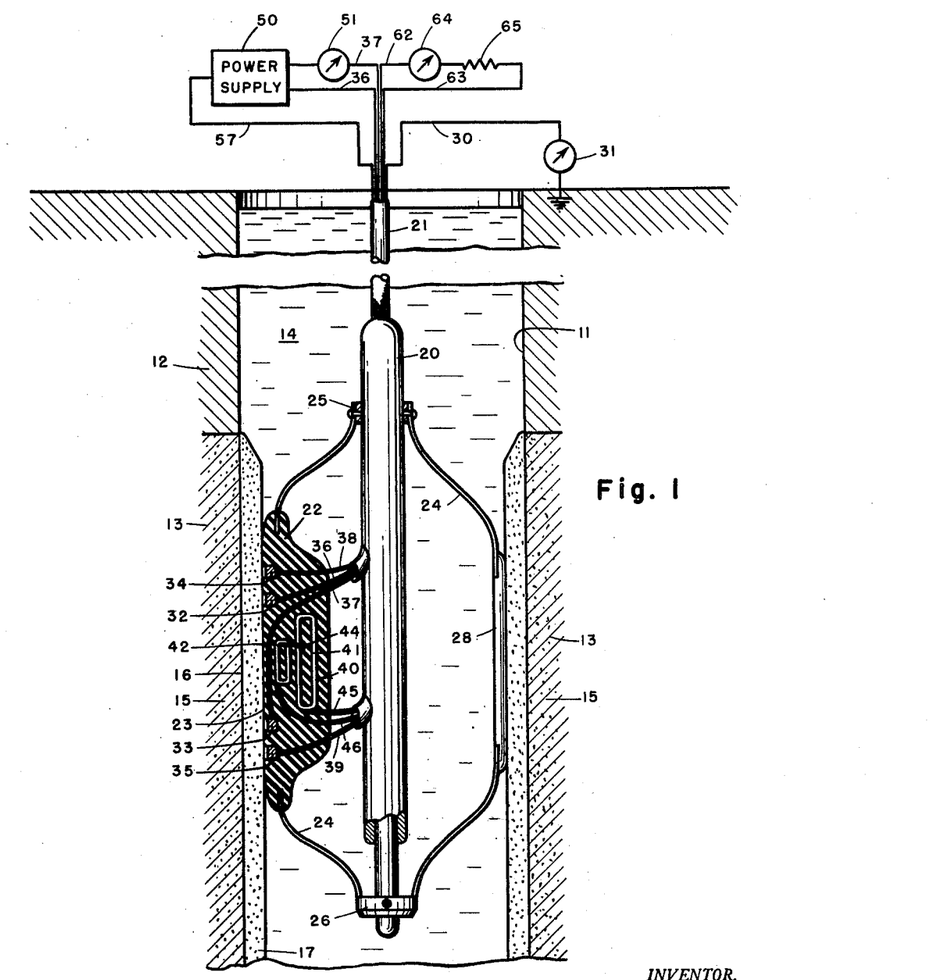
Fig. 1 is a schematic diagram, partly in longitudinal section, showing well logging apparatus constructed according to the invention and disposed in a borehole drilled into the earth.

In the figures, like reference numerals are employed to designate similar parts. As shown in Fig. 1, portions of apparatus constructed in accordance with this invention may be lowered within a borehole 11 extending downwardly through impervious formations 12 and permeable formations 13 and containing an electrically conductive liquid 14, such as a drilling mud. While the apparatus is here employed for well logging and such environment is depicted, the apparatus has other applications such as the detection of low resistivity subsurface zones of a porous solid corresponding to regions of residual moisture.

Within the borehole 11 the liquid 14 invades zone 15 of the permeable formation 13 lying immediately behind the surface 16 of the formation. Where the well liquid 14 is composed of a drilling mud, a mud cake 17 formed of suspended solids characteristically builds up from the surface 16 of formation 13 into the borehole a distance on the order of one inch. It may be observed that the mud cake 17 generally has a resistivity substantially lower than the resistivity of the underlying invaded zone 15 of permeable formations. The resistivity of impervious formations, on the other hand, is nearly constant with distance beyond the borehole wall.

To distinguish permeable and impervious formations, the apparatus comprises a housing 20 suspended from a supporting cable 21 for positioning an electrode-carrying cushion member 22 in pressure contact with the wall of the borehole 11. The cushion member 22 is provided with a wear-resistant face 23 conformable to the wall of the borehole and urged thereagainst by bowed springs 24 supported from a fixed collar 25 and a movable collar 26. A back-up pad 28 similarly supported on bowed springs 24 opposite from the cushion member 22 serves to center the housing in the borehole.

For raising and lowering the housing 20, suitable means (not shown) such as a winch may be disposed at the earth's surface and connected to the cable 21. As the housing moves through varying cross-sections of the borehole 11, the bowed springs 24 flex such that the movable collar 26 travels upwardly and downwardly in proportion to the hole diameter. Suitable means (not shown) may be employed to convert the motion of the collar 26 relative to the housing 20 into a signal representing the borehole diameter for conduction up cable conductor 30 to a suitable recording device 31 grounded at the earth's surface. This calipering signal may be derived, for example, in accordance with the teachings in Patent No. 2,614,164 for "Mutual Inductance Systems," issued October 14, 1952, to Owen H. Huston.

Figure 2:
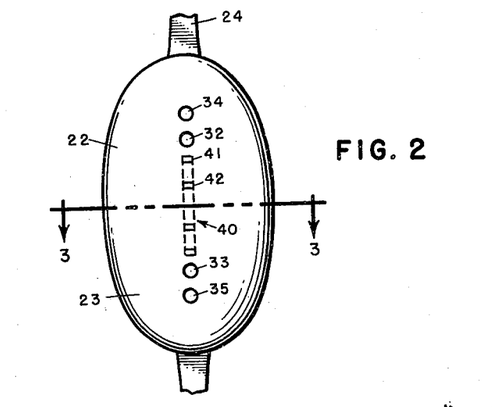
Fig. 2 is an elevational view of the cushion member of Fig. 1.

The cushion member 22 is formed of a suitable flexible insulating material such as rubber, for example. Relieved from the face 23 of the cushion member are a plurality of alined electrodes 32, 33, 34, 35 imbedded in corresponding recesses and connected, respectively, to insulated conductors 36, 37, 38 and 39. The electrodes are in the form of small circular discs having surfaces exposed to the well fluids within the recesses and preferably composed of a relatively non-polarizable substance. Electrodes 32 and 33 are disposed in spaced alignment with respect to the axis of the borehole and serve to pass current into formations contiguous to the borehole to a depth beyond the borehole wall generally coextensive with the zone invaded by filtrate and determined in part by the electrode spacing. While as shown in Fig. 2, electrodes 34 and 35 are spaced outwardly from, but adjacent to the electrodes 32 and 33, respectively, they may be inwardly spaced, if desired, serving in either position to detect a potential difference along the path of current passed between electrodes 32, 33. A highly localized spacing of the current electrodes is maintained by the cushion member 22.

Figure 3:
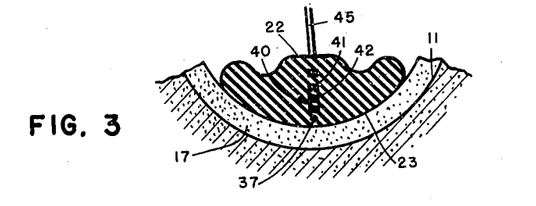
Fig. 3 is a sectional view taken along the line 3—3 of Fig. 2.

In the axial plane of the electrodes centrally of the cushion member 22 is disposed a coil circuit indicated at 40 (Figs. 1–3). While a variety of coil configurations might render the apparatus selectively responsive to particular patterns of survey current passed between electrodes 32 and 33, the arrangement shown affords a sensitivity to the presence or absence of mud cake and permits determinations of formation porosity. Thus, a main coil 41 has a substantial cross sectional area and is spaced inwardly from the face 23 of the cushion member so as to couple broadly with the current flow between electrodes 32 and 33 throughout the depth of its distribution. An auxiliary coil 42, on the other hand, is spaced in close proximity to the face 23, being located between the face 23 and the main coil 41, for tight inductive coupling with current flowing in the mud cake 17. The product of area and turns for coil 42 (or its inductance) suitably is smaller than the product of area and turns (or inductance) of the main coil 41 by an amount necessary for equalizing the mutual coupling between the current path in the mud cake and each of coils 41, 42. The difference between the voltages induced in the main coil 41 and the auxiliary coil 42 is thus, under average conditions, rendered proportional to the component of current between electrodes 32 and 33 flowing at a depth beyond the mud cake 17, or in the invaded zone. Under typical conditions, that is, the voltages induced in coils 41 and 42 solely by the component of current flowing through the mud cake are substantially equal and will cancel one another when the coils are connected in series opposition. To place the coils 41, 42 in series opposition, they are connected by conductor 44 with their turns running oppositely. Connected to the coils 41, 42 are cable conductors 45, 46, respectively.

Since the coils 41 and 42 are positioned to respond to current flowing through the formation between electrodes 32 and 33, care must be taken that the sensitivity of this response is not diminished by the positioning of conductors 36 and 37. To emphasize more strongly the change in current penetration into the formation with and without the presence of a mud cake, conductor 37 may be led axially along the line of the electrodes from the electrode 33 intermediate the face 23 and coil 42.

Conductor 37 is then run out through the rear of the cushion member 22 paired with the conductor 36 so that their inductive fields therealong are cancelled. Effectively, electrodes 32 and 33 and conductor 37 together with the current path through the formations and mud cake constitute a single loop coil of a configuration which varies with the distribution of current in the formation.

For example, since the conductivity of mud cake may be on the order of 100 times greater than that of the invaded zone, survey current passing between electrodes 32 and 33 when opposite a mud cake will be confined almost entirely to the mud cake, thereby presenting a very limited effective coil area. In the absence of mud cake, the effective loop area will be considerably larger. Hence, the coils 41 and 42 are differently sized to couple selectively with these different effective loop areas of the survey current circuit.

Figure 4:
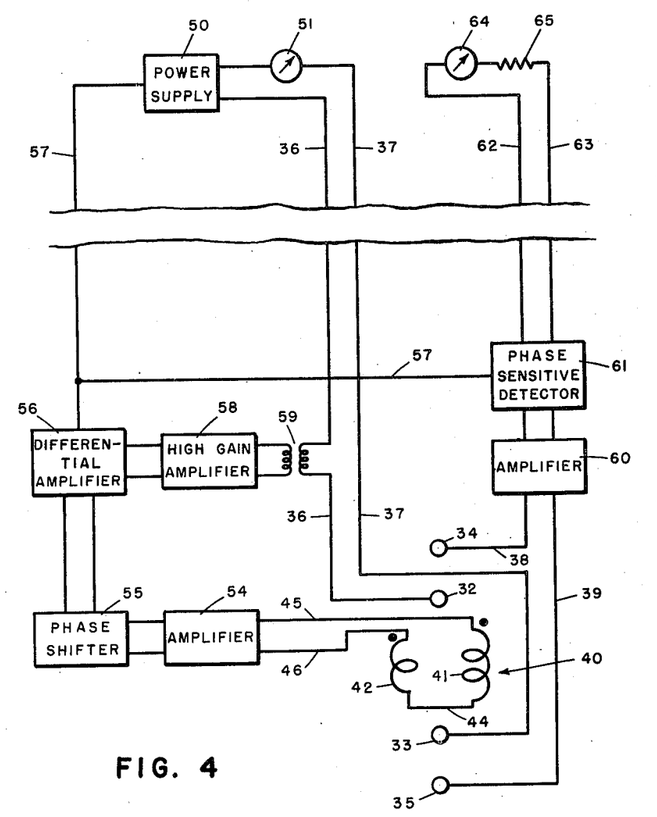
Fig. 4 is a circuit diagram showing a circuit for maintaining the induced potential constant while logging with the apparatus of Fig. 1.

Referring now to Figs. 1 and 4, the electrodes 32 and 33 are connected by conductors 36 and 37, respectively, to the output terminals of an A.C. or pulsating current power supply 50 through a meter 51 which may be a recording galvanometer.

In order to maintain the voltage induced in the series connected coils 41, 42 at a constant net value, conductors 45, 46 are connected to the input of an amplifier 54 which, in turn, supplies an amplified version of the induced voltage through a phase shifter 55 to a differential amplifier 56. The phase shifter 55 is of a design suitable for correcting the phase of the signal supplied by amplifier 54 to bring it into phase with the signal from power supply 50 and, hence, serves generally to advance the phase of the signal an amount approaching ¼ cycle. In addition to the phase-corrected signal representing the voltage induced in the selective coil circuit 40, the differential amplifier 56 is supplied with a reference signal from power supply 50 via conductor 57. The difference between the reference signal from power supply 50 and the phase-corrected signal from phase shifter 55 is supplied by the differential amplifier 56 to a high-gain amplifier 58. Amplifier 58, in turn, is coupled by transformer 59 in series with the survey current circuit 36, 37, to complete a feedback loop tending to regulate the induced voltage at the value of the reference voltage.

To derive an indication of invaded zone resistivity, the measure electrodes 34, 35 are connected by conductors 38, 39 through amplifier 60 to a phase sensitive detector 61. The phase sensitive detector 61 is furnished a reference signal from the power supply 50 via conductor 57. A rectified version of the potential across electrodes 34, 35 is supplied by detector 61 to cable conductors 62, 63 for transmission to a D.C. signal indicating device 64, such as a galvanometric recorder in series with a resistor 65, which may be at the surface of the earth.

In operation, the housing 20 is positioned at the desired level in the borehole 11 with the cushion member 22 and the pad 28 in pressure contact with the walls of the borehole. By means of cable 21, the housing is raised through the borehole, while current is transmitted from the power supply 50 through the meter 51 and the secondary winding of transformer 59 to the current electrodes 32 and 33. When these electrodes 32, 33 are opposite a permeable formation 13 upon which a mud cake 17 has formed (Fig. 1), survey current passes along a localized path between electrodes 32, 33 predominantly through the low resistivity mud cake 17 and to a relatively slight extent through the higher resistivity invaded zone 15 of the formation 13 lying behind the mud cake.

Because the coil circuit 40 is focussed for selective response to current flowing through the invaded zone rather than through the mud cake, the resultant of the voltages developed in the series opposed coils 41, 42 is of relatively slight magnitude. This relatively slight voltage when coupled through the amplifier 54 and phase shifter 55 to the differential amplifier 56 is below the reference voltage supplied from the power supply 50.

Accordingly, the error signal from the differential amplifier 56 applied to the high-gain amplifier 58 results in an output signal coupled by transformer 59 to the survey current circuit tending to increase the magnitude of the survey current. It may be observed that in the presence of mud cake, the electrodes 32, 33 draw a relatively high survey current which is indicated by the meter 51.

Because the coil arrangement 40 compensates for the presence of mud cake by commensurately increasing the magnitude of the survey current, it may be expected that the potential difference between electrodes 34 and 35 corresponds to the resistivity of the invaded zone rather than to the resistivity of the mud cake or mud cake and invaded zone combined. This actually follows from the fact that the feedback signal from the coil circuit 40 requires that a fixed amount of current be passed through the invaded zone regardless of the amount of current diverted through the mud cake. Since a fixed amount of current thus flows through the invaded zone, the potential differences developed along the path of this fixed current will reflect the encountered resistivity of the invaded zone. Accordingly, the indicating device 64 records a value of invaded-zone resistivity from which may be computed the porosity of the formation 13.

When the electrodes 32, 33 are opposite an impervious formation 12, no mud cake is present to divert current closely adjacent the face 23 of the cushion member 22. Accordingly, only a relatively slight voltage will be developed in coil 42 which is compensated for by the larger area and greater number of turns of coil 41. The resultant voltage induced in the series connected coils 41, 42 again has the fixed reference value required by the feedback loop for the coil circuit 40. This fixed induced voltage, in turn, requires that the survey current have substantially the same intensity and distribution in formation 12 as in the invaded zone of formation 13. Absent an invaded zone, the signal recorded by the indicating device 64 represents the formation resistivity. However, in the absence of a low resistivity mud cake, the survey current will have a relatively small value. Thus, the occurrence of a substantial change in the magnitude of survey current will define the boundaries of mud-caked formations. That is, the occurrence of exceptionally high survey current delineates intervals along a borehole wall upon which a mud cake is formed. A ready means of defining and locating permeable formations is thus provided.

It may be observed that the indicating device 64, being responsive only to D.C. signals provided by the phase sensitive detector 61, is insensitive to any A.C. signals unavoidably coupled to the cable conductors 62, 63 from cable conductors 36, 37 or 57.

The operation of the borehole caliper may be understood by reference to above-cited Patent No. 2,614,164. Through a recording of borehole diameter by the recorder 31 on a conventional depth log in correspondence with the recording of invaded zone resistivity by device 64 and survey current by recorder 51, a correlation of mud cake indications with changes in borehole diameter may be obtained.

Figure 5:
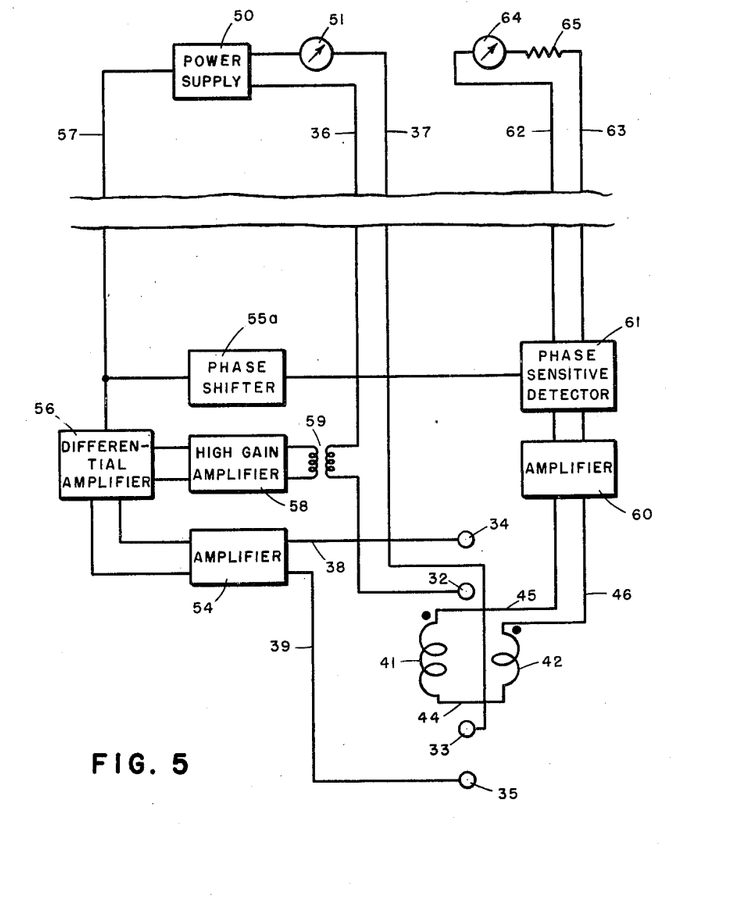
Fig. 5 is a circuit diagram of an arrangement for maintaining a potential difference constant while operating the apparatus of Fig. 1.

In a second embodiment of the invention, a different circuit, shown in Fig. 5, is contained within the housing 20 to provide indications of the conductivity of the invaded zone in permeable formations. In order to maintain constant the potential difference across electrodes 34, 35, this potential difference is applied by conductors 38, 39 to the input of amplifier 54 and the derived signal is applied directly to the differential amplifier 56. Again employing a reference potential supplied from power supply 50 via conductor 57, an error signal is developed which is supplied to high-gain amplifier 58 to control a correction of the survey current passed between electrodes 32, 33 necessary to maintain the potential difference at electrodes 34, 35 constant.

The resultant of the voltages induced in coils 41, 42 is applied through conductors 45, 46 to the input of amplifier 60 and thence to the phase sensitive detector 61. Since the resultant voltage will be out of phase with the signal from power supply 50, a modified phase shifter 55a is inserted in the line 57 carrying a reference signal for operation of the phase sensitive detector 61. This phase shifter suitably will retard the phase of the reference signal to correspond with the lagging phase of the induced potential signal supplied from amplifier 60.

Figure 6:
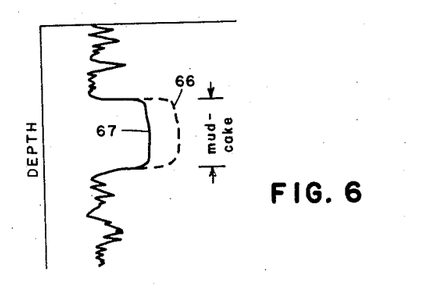
Fig. 6 is a graphical representation of the variation of apparent formation conductivity and of survey current while passing a region of mud caked formation.

In an exemplary operation of this embodiment of the invention, the potential difference between electrodes 34 and 35 is maintained at a constant value substantially equal to the magnitude of the reference signal supplied over a conductor 57 to the differential amplifier 56. In maintaining this constant potential difference, the survey current is controlled by the high-gain amplifier 58 such that the survey current varies partly in accordance with the conductivity of the invaded zone and partly in dependence upon the presence or absence of mud cake. This dependence of the survey current is illustrated in Fig. 6 by the dashed curve 66 representing the output of recorder 51. A curve 67 is produced by recorder 64 representing invaded zone conductivity. In the absence of mud cake, the sensitivities of recorders 51, 64 are adjusted such that curve 66 produced by recorder 51 is substantially superimposed upon curve 67 produced by recorder 64. The disproportionate increase of the survey current curve 66 relative to the conductivity curve 67 is observed to correspond with the occurrence of mud cake.

That the curve recorded by the indicating device 64 will represent the conductivity of the invaded zone follows from the fact that the voltage induced in the series-opposed coils 41, 42 is directly proportional to that portion of the survey current which flows through the invaded zone even though another portion of the survey current flows through the mud cake. Since the signal supplied to the indicating device 64 in Fig. 5 varies in accordance with the survey current rather than the potential difference along its path, curve 67 recorded by the device 64 represents conductivity, whereas, the indicating device 64 as connected in Fig. 4 records a resistivity curve.

Figure 7:
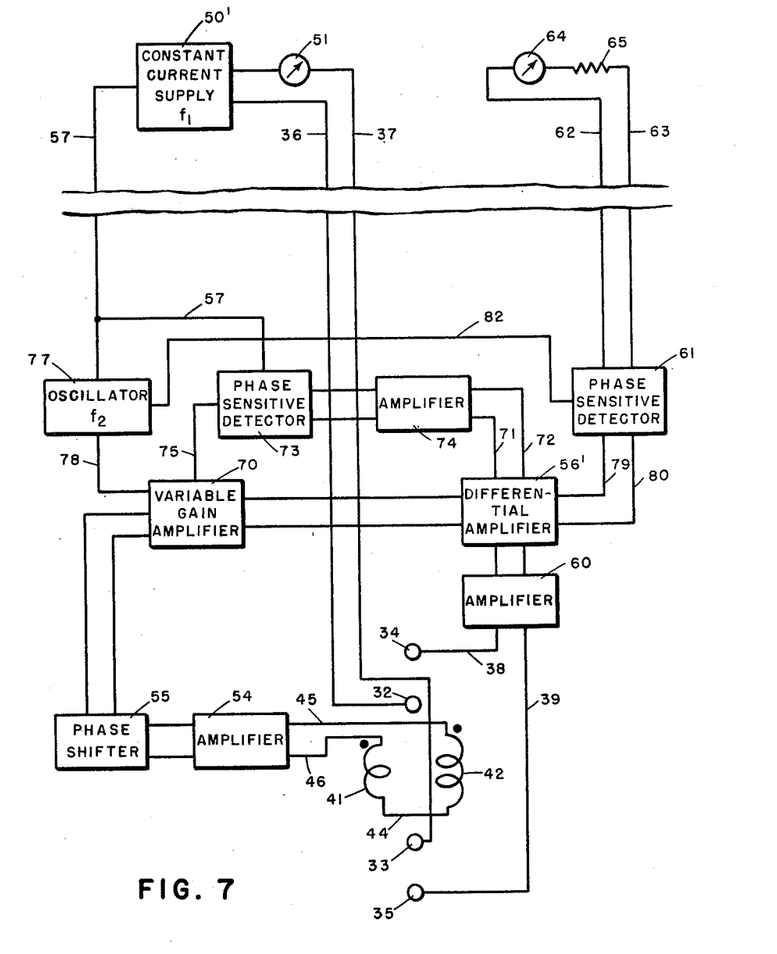
Fig. 7 is a circuit diagram of yet another arrangement for deriving an indication of true formation resistivity employing the apparatus of Fig. 1.

By a further modification of circuitry which is illustrated in Fig. 7, invaded zone resistivity may be computed while maintaining the survey current at a constant value. Thus, a power supply 50' yielding a constant current of frequency $f_1$ is connected to cable conductors 36, 37 in lieu of the variable current power supply 50. As a result of passing substantially constant current between the electrodes 32 and 33, a resultant voltage will be induced in coils 41, 42 which has a relatively fixed value in homogeneous formations but a substantially reduced vaue in mud-caked formations. This resultant induced voltage is amplified in amplifier 54 and the output signal of the amplifier 54 is supplied to phase shifter 55 for correction of its phase to correspond with that of the supply 50'. The phase corrected signal is then supplied to a variable gain amplifier 70 of a type having a relatively broad pass band without reversal of phase. An output signal amplified in the variable gain amplifier 70 by a factor G is supplied to the input of differential amplifier 56'. The second input to the differential amplifier 56' is derived from amplifier 60 connected by conductors 38, 39 to measure electrodes 34, 35.

Through output conductors 71, 72 the differential amplifier 56' is coupled to a phase sensitive detector 73 supplied with a reference signal at frequency $f_1$ via conductor 57. An amplifier 74 may be interposed between the differencing amplifier 56' and the phase sensitive detector 73 to increase the signal level. The output of the phase sensitive detector 73 is supplied via conductor 75 to the gain control section of the variable gain amplifier 70, thus completing a feedback loop which tends to adjust the gain G of the variable gain amplifier such that its output signal at frequency $f_1$ representing the induced voltage in coils 41, 42 is equated to the signal representing the potential difference across electrodes 34, 35. In other words, the gain G is set equal to the ratio of the signals from amplifiers 60 and 54 representing, respectively, the potential difference and the induced potential.

In order to obtain an indication of the resistivity of the invaded zone, it is necessary to multiply the ratio G by a magnitude representing the normal voltage induced in the coils 41, 42 when the cushion member 22 is opposite an homogeneous impervious formation. This constant, normal value may be determined experimentally for any given configuration of electrodes 32, 33 and coils 41, 42. To accomplish the multiplication of this constant factor by the gain G, an oscillator 77 deriving power via conductor 57 from the power supply 50' is provided for generating a signal of constant magnitude at a frequency $f_2$. The frequency $f_2$ may, for example, be 4000 cycles where the frequency $f_1$ is 60 cycles, although other frequencies may, of course, be employed. The signal at frequency $f_2$ from the oscillator 77 is appropriately adjusted to have a value equal to the normal value of the signal from amplifier 54 when the coils 41, 42 are opposite an homogeneous impervious formation such as formation 12. This constant signal is then supplied via conductor 78 to the input of the variable gain amplifier 70 wherein it experiences a gain G identical to the adjusted gain experienced by the signal at frequency $f_1$ from the amplifier 54. While this signal of frequency $f_2$ representing the invaded zone resistivity may be supplied directly to the phase sensitive detector 61, it conveniently is supplied through the differencing amplifier 56' via output conductors 79, 80 to the phase sensitive detector 61. To prevent signals of frequency $f_1$ from affecting the indicating device 64, the phase sensitive detector 62 is supplied with a reference voltage at frequency $f_2$ from the oscillator 77 via conductor 82. In consequence, a log of the resistivity values of invaded zones in formations traversed by the cushion member 22 may be recorded by the indicating device 64.

In an operation of the apparatus of Fig. 7, a steady A.C. current supplied from the source 50' passes between current electrodes 32, 33 into an adjacent formation. Where the adjacent formation like formation 12 is impervious, the current is distributed in a relatively fixed pattern within a zone corresponding in depth to the invaded zones encountered in permeable formations. In permeable formations such as formation 13, on the other hand, the current will be largely concentrated in the mud cake 17, although a small portion of the survey current will pass through the invaded zone. As the coils 41, 42 are, by reason of their series opposition, selectively responsive to survey current at the depth of the invaded zone, the resultant induced voltage varies primarily as a function of whether or not a mud cake is present. If desired, of course, suitable means can be employed to detect this variation in the resultant induced potential. However, in the circuit arrangement contemplated in Fig. 7, the induced potential is passed through the variable gain amplifier 70 to the differential amplifier 56' to produce an error signal of frequency $f_1$ which adjusts the gain of the variable gain amplifier to the desired value G. This value G, as above stated, represents the ratio of the potential difference on electrodes 34, 35 to the potential induced in coils 41, 42. Since the value of this ratio differs from the invaded zone resistivity by a constant factor, the fixed signal input to the variable gain amplifier 70 at frequency $f_2$ allows the true value of invaded zone resistivity to be derived from the variable gain amplifier. The curve recorded by the indicating device 64 thus gives the correct value for the resistivity of invaded zones in permeable formations traversed by the cushion member 22.

For a correct reading of either resistivity or conductivity with the foregoing embodiments of the invention, a necessary condition is the absence of current flow between electrodes 32, 33 and around the back side of the cushion member 22. The cushion member, as shown in Figs. 1, 2 and 3, extends a substantial distance on either side and to the rear of the electrodes 32, 33, correspondingly to extend the path of any current flow around the back side and also to prevent close coupling of any such current flow with the coils 41, 42. Nonetheless, it may be found desirable in very low resistivity muds, for example, to employ a balanced electrode configuration shown in Figs. 8, 9 and 10 further to reduce the likelihood of such current flow. In lieu of the current electrodes 32, 33, a central electrode 85 is connected by conductor 36 to the current supply 50', while electrodes 86 and 87 spaced, respectively equal distances above and below the electrode 85 are connected in common by conductor 37 to the other output terminal of the constant current supply 50'.

Figure 8:
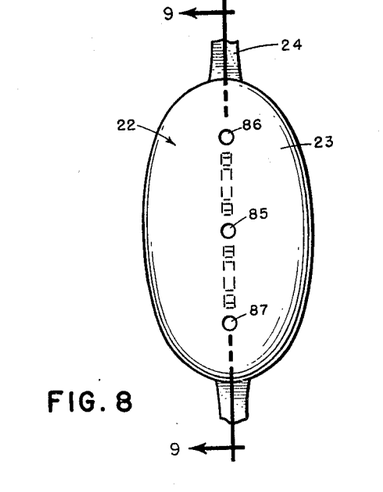
Fig. 8 is an elevational view similar to Fig. 2 but illustrating an electrode arrangement in which survey current is divided along oppositely disposed paths.
Figure 9:
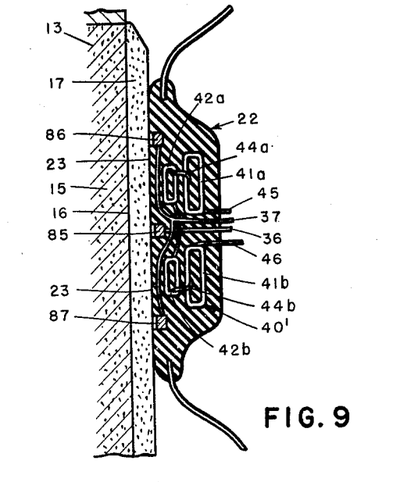
Fig. 9 is a sectional view taken along the line 9—9 of Fig. 8.

For a satisfactory inductive coupling with the divided stream of current flowing from electrode 85 through the invaded zone, a modified arrangement 40' of coils has been found suitable. Centered between, and in the plane of electrodes 85 and 86 are embedded coils 41a and 42a connected by conductor 44a in series opposition. Centered between electrodes 85 and 87 and in the plane of these electrodes perpendicular to the face 23 are similar coils 41b and 42b connected in series opposition by conductor 44b. Since current from electrode 85 flows in opposite directions to the electrodes 86 and 87, coil 41a is wound oppositely to coil 41b and, similarly, coil 42a is wound oppositely to coil 42b. Conductor 45 connecting with coil 41a, conductor 46 connecting with coil 41b, and a conductor 49 connecting coils 42a and 42b complete a series connection of the four coils. This series connection is such that the divided survey current induces voltages of the same polarity in coils 41a and 41b and voltages of the opposite polarity in coils 42a and 42b.

Figure 10:
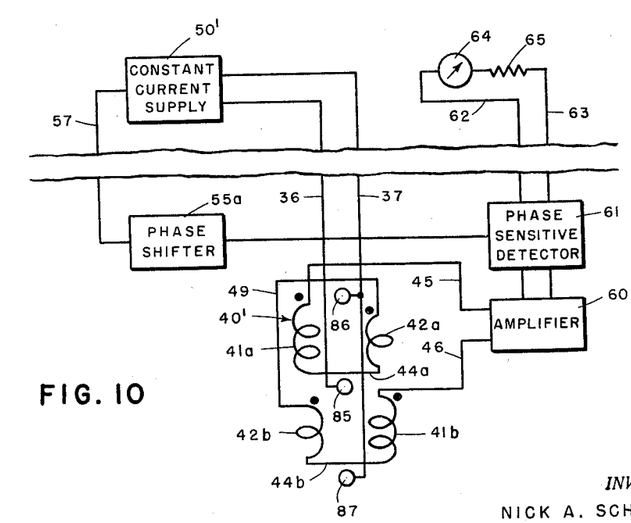
Fig. 10 is a circuit diagram of an arrangement for deriving an indication of the presence of mud cake with the apparatus of Figs. 8 and 9.

The resultant voltage induced in the coils is supplied via conductors 45, 46 to the input of amplifier 60 and thence to phase sensitive detector 61. Detector 61 is supplied with a reference signal from the supply 50' corrected in phase through the phase shifter 55a. The D.C. output derived from the phase sensitive detector 61 is coupled, as usual, by conductors 62, 63 to the indicating device 64 for recording, if desired, as a function of depth.

In operation, constant current is introduced from electrode 85 into the formations contacted by the face of the cushion member 22. This current divides in accordance with the resistivity each portion encounters, generally into unequal currents returned at the electrodes 86 and 87. Since the current return electrodes 86, 87 are disposed on either side of the current electrode 85, no appreciable tendency toward current flow over the back side of the cushion member 22 is encountered. The coupling of each of the coil sets 41a, 42a and 41b, 42b with current flowing between the associated pairs of electrodes 85, 86 and 85, 87, respectively, results in a balancing of potentials induced in coils 41a, 41b against those induced in coils 42a, 42b. By combining the two sets of coils in series, the effects of asymmetry in the division of the survey current between the two electrodes 86 and 87 are offset so that the resultant induced voltage is proportional to the current flowing from the electrode 85 in both directions through the invaded zone.

By reason of the selective response of the coil circuit 40' attributable to the narrow coupling of coils 42a and 42b to current passing through the mud cake, and the opposed broad coupling of coils 41a and 41b, the resultant induced voltage will be markedly diminished when mud cake is present. The major portion of the constant survey current is then diverted into the mud cake. Hence, a curve recorded by indicating device 64 will have substantially only two values, a high value indicating mud cake and a low value indicating its absence.

While particular embodiments of the invention have been shown, each adapted to distinguish permeable and impervious formations, it will be evident that various other modifications and applications may be conceived by those skilled in the art. Thus, the invention is adapted to the location of a conductive film on a less conductive base or to the determination of absence of such film. Likewise, more complex coil configurations may be resorted to for increasing the degree of selectivity. If desired, current may be passed between the current electrodes while the housing is moved continuously through a borehole. Indications may thus be derived of the boundaries between permeable and impervious formations along the borehole. In applications where the electrodes are not subject to immersion in conductive liquids, they may be applied to localized points on the surface of a medium being investigated without the use of an insulating cushion member.

The invention, therefore, is not to be limited to the illustrated embodiments but is of a scope defined in the appended claims.

I claim:

1. In a method for investigating characteristics of a medium, the steps of passing current between two localized points at the surface of a medium through a region in said medium extending beneath said surface, selectively detecting the component of the magnetic field produced between said points externally of said medium by current flowing in a predetermined discrete depth zone beneath said surface, and deriving a signal dependent upon the value of said detected field as a measure of the resistance characteristics of said medium in said predetermined depth zone.

2. In a method for electromagnetically investigating characteristics of a medium, the steps of passing current between two localized points at the surface of a medium through a region in said medium extending beneath said surface, selectively detecting the component of the magnetic field produced between said points externally of said medium by current flowing closely beneath said surface, detecting the magnetic field produced between said points externally of said medium by the entire current flow through said medium, and deriving a signal representing the difference of said detected fields.

3. In a method of detecting the resistivity characteristics of a medium at a depth beneath its surface, the steps of connecting spaced points on said surface to form a first circuit which includes said medium, placing portions of a second circuit opposite said surface between said points for a maximum mutual inductance with said first circuit when the effective path of the same through said medium is in a limited zone disposed beneath said surface at a prescribed depth, energizing said first circuit, and deriving a signal from said circuits representative of the resistivity of said zone.

4. In a method for investigating formations traversed by a borehole, the steps of passing current between two localized points on the wall of a borehole through a path extending into formations beneath said wall, and selectively detecting the component of the magnetic field produced between said points within the borehole by the portion of said current flowing in a predetermined discrete subsurface zone of said wall.

5. In a method for investigating formations traversed by a bore hole, the steps of passing current between two localized points on a borehole wall to follow a path through formations therebeyond, detecting the value of the magnetic field produced in the borehole by the portion of said current flowing in a subsurface zone of said formations, detecting the value of a potential difference along the path of said current, and regulating said current to maintain constant one of said values.

6. In a method for investigating formations traversed by a borehole, the steps of passing current between two localized points on the wall of a borehole to follow a path through formations behind said wall, maintaining constant the magnetic field in the borehole produced by a selected portion of said current in said formations, and detecting a potential difference along the path of said current to provide indications which are representative of formation characteristics.

7. In a method for investigating formations traversed by a borehole, the steps of passing current between two localized points on a borehole wall to follow a path through said formations, regulating said current to maintain constant a potential difference along said current path, and detecting the magnetic field produced in said borehole by the portion of said current flowing in a subsurface zone through said formations.

8. In a method for investigating permeable formations traversed by a borehole, the steps of passing current between two localized points on a borehole wall to follow a path through said formations, detecting a potential difference along the path of said current, deriving an induced potential from the magnetic field in the borehole produced by the portion of said current flowing in the invaded zone of said formations, and combining said potential difference and said induced potential to derive an indication of the invaded zone resistivity of said formations.

9. In apparatus for investigating subsurface characteristics of a medium, the combination of a support member, a pair of spaced electrodes carried by said support member for electrically contacting the surface of a medium in a localized region thereof, and a selective coil circuit including at least two coils connected in series opposition carried by said member, said coils having different distance-sensitivity characteristics for inductive coupling primarily with different portions of current passed between said electrodes through the medium.

10. In apparatus for investigating subsurface characteristics of a medium, the combination of an insulating cushion member having a face for bearing on the surface of a medium while moving relative thereto, a pair of spaced electrodes embedded in said face each with a portion exposed for electrical contact with said surface, and a depth selective coil circuit carried within said cushion member for selective inductive coupling with a portion of any current passed between said electrodes through said medium.

11. In apparatus for investigating earth formations traversed by a borehole, the combination of a flexible insulating cushion member adapted for movement through a borehole and having a face conformable to the borehole wall, a pair of spaced electrodes embedded in said face with a portion exposed for electrical contact with said wall, and at least two coils adapted for movement with said cushion member and lying substantially in a plane which extends through said electrodes, said coils being differently placed with respect to said electrodes for inductive coupling primarily with different portions of current passed between said electrodes and connected in series opposition for selectively detecting a magnetic field component representative of current flow in a given depth zone beyond the borehole wall.

12. In apparatus for investigating earth formations traversed by a borehole, the combination of an insulating cushion member adapted for movement through a borehole and having a face conformable to the borehole wall, at least two spaced electrodes embedded in said face with aligned portions of each exposed for electrical contact with said wall, at least two coils enclosed by said cushion member and lying substantially in a plane extending through said exposed portions, one of said coils being positioned close to the line of said electrodes for tight coupling with current passed therebetween and flowing close to said line, another of said coils being spaced more remotely from said line and having a higher inductance, said coils being connected in series opposition for selective response to current flowing between said electrodes remotely from the line thereof, and circuit means for supplying current to said electrodes including a conductor extending along the line between said electrodes.

13. In apparatus for investigating earth formations traversed by a borehole, the combination of an insulating cushion member adapted for movement through a borehole and having a face conformable to the borehole wall, a pair of spaced electrodes embedded in said face with a portion of each exposed for electrical contact with said wall, a coil circuit enclosed by said cushion member, said circuit including a pair of coils connected in series opposition and positioned for selective coupling with current passed between said electrodes through a zone lying a substantial distance behind the borehole wall, means for supplying said electrodes with alternating current, feedback means for regulating said current to render the potential induced in said coil circuit substantially constant, and means for indicating the magnitude of said current.

14. In apparatus for investigating earth formations traversed by a borehole, the combination of an insulating cushion member adapted for movement through a borehole and having a face conformable to the borehole wall, a pair of spaced electrodes embedded in said face with a portion of each exposed for electrical contact with said wall, a coil circuit enclosed by said cushion member, said circuit including a pair of coils connected in series opposition and positioned for selective coupling with current passed between said electrodes through a zone lying a substantial distance behind the borehole wall, means for supplying said electrodes with alternating current, feedback means for regulating said current to render the potential induced in said coil circuit substantially constant, and means for indicating a potential difference along the path of said current through said zone.

15. In apparatus for investigating earth formations traversed by a borehole, the combination of an insulating cushion member adapted for movement through a borehole and having a face conformable to the borehole wall, at least two spaced electrodes embedded in said face with a portion of each exposed for electrical contact with said wall, a coil circuit enclosed by said cushion member and positioned for selective inductive coupling with current passed between said electrodes along a path substantially removed from the face of said cushion member, means for passing an alternating current along a path between said two electrodes, feedback means responsive to a potential difference along the path of said current to regulate said current whereby said potential difference is maintained substantially constant, and means for indicating the potential induced in said coil circuit.

16. In apparatus for investigating earth formations traversed by a borehole, the combination of an insulating cushion member adapted for movement through a borehole and having a face conformable to the borehole wall, at least four aligned electrodes embedded in spaced relation in said face with a portion of each exposed, a coil circuit enclosed by said cushion member and positioned for selective inductive coupling with current passed between the inner pair of said electrodes and flowing along a path substantially removed from the face of said cushion member, means for supplying alternating current of constant value at a first frequency to said inner pair of electrodes, a variable gain amplifier, means for adjusting the gain of said amplifier in proportion to the ratio between the potential difference across the outer pair of said electrodes and the potential induced in said coil circuit, and means for passing a signal of a second frequency through said variable gain amplifier to derive a signal proportional to the resistivity along the current path to which said coil circuit is selectively coupled.

17. In apparatus for investigating earth formations traversed by a borehole, the combination of an insulating cushion member adapted for movement through a borehole and having a face conformable to the borehole wall, three alined electrodes embedded in spaced relation in said face with a portion of each exposed for electrical contact with said wall, an inductive circuit enclosed by said cushion member and including series connected coils disposed on opposite sides of the center electrode and in the plane of said electrodes, means for passing a constant current between said center electrode and the outer electrodes, said coils being selectively coupled with current flowing along paths on the respective sides of said center electrode substantially removed from the face of said cushion member, and means coupled with said inductive circuit for deriving an indication of the presence or absence of a mud cake on the borehole wall.

References Cited in the file of this patent

UNITED STATES PATENTS

| | | |
|---|---|---|
| 1,791,933 | Mueser | Feb. 10, 1931 |
| 1,803,405 | Ricker | May 5, 1931 |
| 2,108,463 | Zuschlag | Feb. 15, 1938 |
| 2,669,689 | Doll | Feb. 16, 1954 |
| 2,712,629 | Doll | July 5, 1955 |
| 2,723,374 | Williams | Nov. 8, 1955 |
| 2,730,673 | Jakosky | Jan. 10, 1956 |
| 2,735,980 | Wait | Feb. 21, 1956 |